J. G. CLEMENS.
PROTECTOR FOR POLYPHASE ELECTRICAL MACHINERY.
APPLICATION FILED DEC. 10, 1910.
1,012,599.
Patented Dec. 26, 191
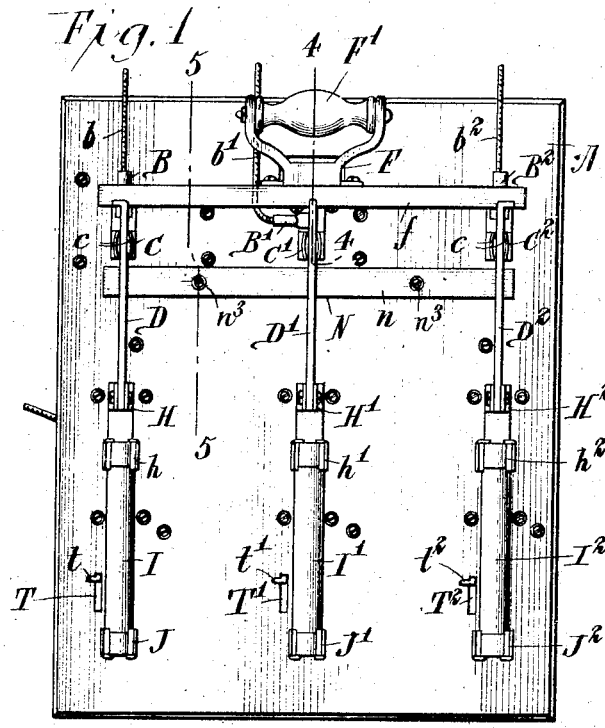
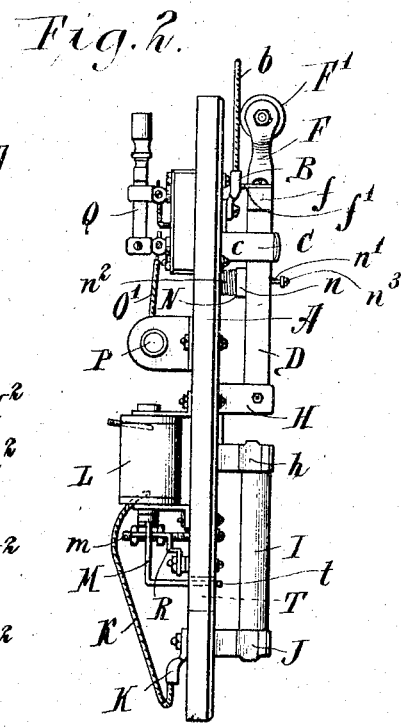
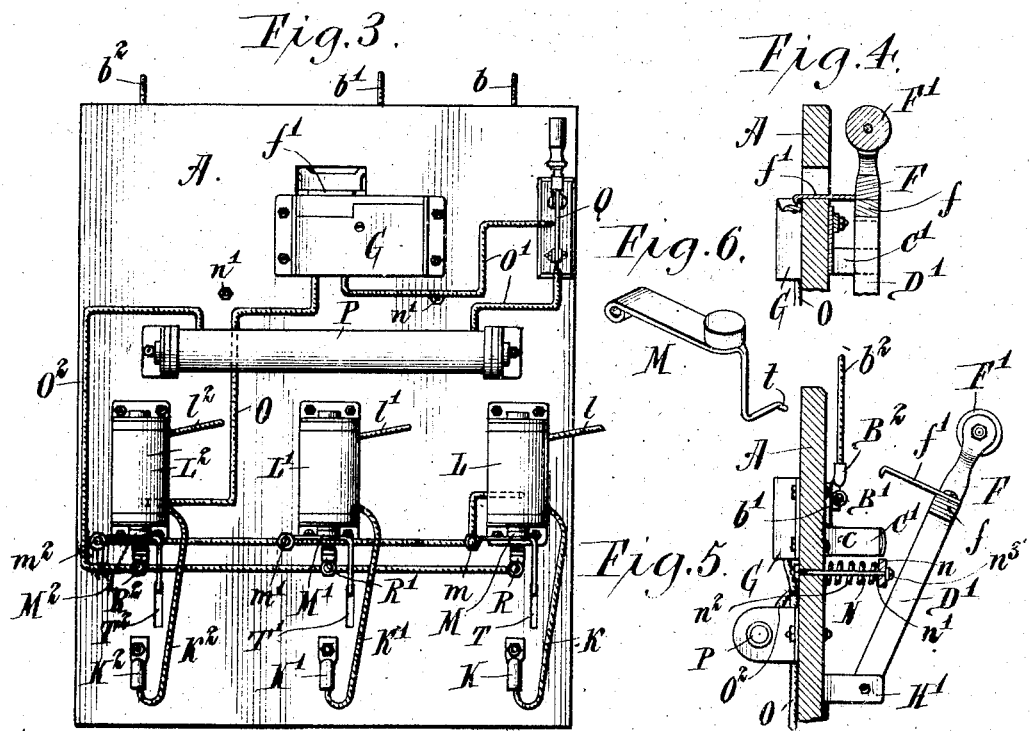
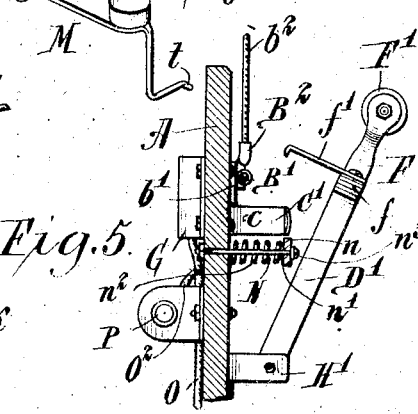
John G. Clemens, Inventor.

UNITED STATES PATENT OFFICE.

JOHN G. CLEMENS, OF BUFFALO, NEW YORK, ASSIGNOR OF ONE-HALF TO FRANK H. KAISER, OF BUFFALO, NEW YORK.

PROTECTOR FOR POLYPHASE ELECTRICAL MACHINERY.

1,012,599.  Specification of Letters Patent.  Patented Dec. 26, 1911.

Application filed December 10, 1910. Serial No. 596,661.

*To all whom it may concern:*

Be it known that I, JOHN G. CLEMENS, a citizen of the United States, and resident of Buffalo, in the county of Erie and State of New York, have invented certain new and useful Improvements in Protectors for Polyphase Electrical Machinery, of which the following is a specification.

My invention relates to protectors for polyphase electrical machinery and more particularly for alternating current polyphase motors.

The primary object of my invention is the production of an apparatus for the purpose described which will protect the motor or other electrical apparatus from running on two phases in case of interruption in any one phase in a three-phase motor, thus preventing the burning out of the motor or other apparatus which would occur if allowed to run on two phases.

Another object of my invention is the provision of an apparatus of this kind, including a switch, whereby in case of interruption of the current on any phase from any reason whatsoever, said switch will open so that the entire current is shut off and the motor stopped; the causes of interruption being among others, loose contacts, lines going down, opening of primary winding of motor, short circuiting, current going off and coming back suddenly, low voltage, blowing of a fuse, etc.

A further object of my invention is the provision of means whereby on cessation of the current in one phase, due to the fuse of said phase blowing out, the particular fuse blown can be quickly ascertained by means of an indicator embodied in the construction of the apparatus.

A still further object of this invention is, the provision of means whereby, when shutting down the motor, the apparatus will demonstrate to the operator that it is in good order; and to further improve on protectors for polyphase electrical apparatuses, as and in the manner to be hereinafter more fully described.

The invention primarily consists in a suitable support, a switch having two or more poles, a corresponding number of fuses and magnetic coils all connected in polyphase circuit, means for holding the switch in closed position so as to close the circuit, and the provision of a secondary circuit controlling releasing-means whereby the switch is opened when for any reason the current in any of the phases is interrupted; and it further consists in the construction, arrangement and combination of parts to be hereinafter described and particularly pointed out in the subjoined claims.

In the drawings,—Figure 1 is a front elevation of my improved protector. Fig. 2 is a side elevation of the same. Fig. 3 is a rear view. Fig. 4 is a vertical section taken on line 4—4, Fig. 1. Fig. 5 is a vertical section taken on line 5—5, Fig. 1. Fig. 6 is a detached perspective view of one of the armatures and its indicating finger.

In three-phase motors as ordinarily used and wired, the blowing of the fuse in any one phase would cause the motor to continue in action on the remaining phases without its being noticed by the attendant or operator, unless he were present at the time the fuse blew out. The running of the motor under such conditions would cause it to become heated and quickly burned out. Other damaging effects result from such conditions. My apparatus is intended to automatically protect the motor against such conditions and does not require the presence of the attendant or operator, since when the current in any one of the phases is interrupted, the entire current is broken by the throwing of the main switch, the interruption of the electrical service will therefore be noticed by the attendant or operator regardless of his presence, so long as he is within reach of the machinery or apparatus driven by the motor, as the stoppage of such machinery or apparatus will assure him that the switch has been thrown out and that his attention is required to replace the blown fuse with a perfect one, after which the apparatus is set for further action, as and in the manner to be hereinafter described.

Referring now to the drawings in detail, like letters of reference refer to like parts in the several figures.

The apparatus includes a marble slab A or other support of insulating material to which are secured the various remaining parts, including the circuit wires. To this slab, preferably on the front side thereof, I secure three switch terminals B, $B^1$, $B^2$, to which are led three wires $b$, $b^1$, $b^2$, each carrying one of the three phases. These switch terminals include sprockets C, C¹, C²; the arms c of each pair being spaced from each other to receive the three switch blades D, D¹, D² of a three-pole switch F, said switch having the upper or outer ends of said blades connected by a cross bar f of insulating material to which is secured a handle F² and a rearwardly extending hook f¹ which is adapted for engagement with a magnetic lock G of common construction secured to the rear side of the slab or support A.

The lower or inner ends of the switch blades D, D¹, D² of the switch F are pivotally secured to brackets H, H¹, H² fastened to the slab A and having integrally therewith or in electrical connection therewith, fuse retaining-clips h, h¹, h² in which the upper ends of fuses I, I¹, I² are held, the lower ends of said fuses being secured in retaining clips J, J¹, J² secured to the front of the slab or support A and in electrical connection with terminals K, K¹, K² fastened to the rear side of the slab A and having wires k, k¹, k² corresponding respectively with the wires b, b¹, b² and each carrying one of the three phases. The wires b, b¹, b² direct the current from the source of electrical supply, while the wires k, k¹, k² lead to magnetic coils L, L¹, L² secured to the rear side of the slab or support A; and from these coils wires l, l¹, l² lead to the motor or other electrical apparatus. These magnetic coils are used in conjunction with armatures M, M¹, M² pivotally mounted on posts m, m¹, m², extending rearward from the slab or support. These coils L, L¹, L² when energized, attract the armatures and hold the same in elevated position, as shown in Figs. 2 and 3; and when thus positioned, they prevent the current passing up to the magnetic lock, which is in engagement with the hook f¹ on the main switch F, thus holding said switch in locked position, in which position the primary circuit is closed.

The current enters the terminals B, B¹, B² through the wires b, b¹, b² and when the switch is closed, as shown in Figs. 1, 2 and 4, it passes through the switch-blades D, D¹, D² and through the fuses I, I¹, I² connected therewith. From the said fuses it is directed to the coils L, L¹, L² and from the latter to the motor (not shown) by the wires l, l¹, l². These three phases may be termed the primary circuit and by the passing of the current through the coils L, L¹, L², which are energized thereby, the secondary circuit, to be presently described, is broken by reason of the armatures M, M¹, M² being held in elevated position. These armatures serve to establish or break the secondary circuit; and with the poles m, m¹, m² on which they are mounted, they form a part of the secondary circuit, which is provided for the purpose of releasing the magnetic lock and disengaging the lock-hook f¹ of the main switch therefrom. When this lock-hook is disengaged from the magnetic lock, the blades D, D¹, D² of the main switch are disengaged from the sprockets C, C¹, C² by means of a projector N comprising a cross bar n arranged transversely in front of the slab or support A and mounted on a pair of slide bolts n¹ secured in opening in the said slab or support and surrounding which are coil springs n² bearing with one of their ends against said slab or support and with their other ends against the cross bar n. Said cross bar is made of insulating material to prevent short circuiting from one blade of the switch to another; and when the switch is in closed position and locked by the magnetic lock G, the cross bar is forced rearward toward the slab or support with the springs n² compressed. Therefore, when the lock hook f¹ of the main switch is disengaged from the magnetic lock, the projector N, through the action of the springs n², causes the switch to be swung outward and the primary circuit broken. For the purpose of limiting the outward movement of the projector N, nuts n³ are secured to the front ends of the slide bolts n¹.

From a suitable point in one of the phases of the apparatus, preferably from the bracket H², a wire O is led to one terminal of the magnetic lock G, and from the other terminal of said lock, a wire O¹ is led to one of the terminals of a resistance coil P; and in this wire O¹ is located a baby knife-switch Q. From the other terminal of the resistance coil a wire O² is led to three contacts R, R¹, R² with which the armatures M, M¹, M² are adapted to co-act. The poles m, m¹, m² on which said armatures are pivotally mounted, are connected with one of the phases of the circuit, preferably with the bracket H, by means of a wire S. The secondary circuit which releases the magnetic lock therefore starts from one of the phases above the fuses, passes through the magnetic lock G, then through the baby knife-switch Q, next through the resistance coil to the contacts R, R¹, R², beneath the armatures, then across the armatures when in contact with said contacts to another phase of the current. These parts therefore constitute the secondary circuit.

Formed in the slab or support A are openings T, T¹, T², one for each phase and formed on or attached to the armatures M, M¹, M² are indicating fingers t, t¹, t², respectively; these indicating fingers being directed downwardly from the free ends of the armatures, thence forwardly through the openings T, T¹, T² and finally laterally to provide indicating points which lie in front of the slab or support. When the armatures are attracted by the magnetic coils, the indicating fingers as seen from the front of the slab or support are at the upper ends of the openings T, T¹, T², and when for any reason the current in any one of the phases is interrupted, the corresponding armature gravitates, consequently moving the indicating finger into a lower position; or in the event of the entire current being interrupted, all of the indicating fingers will be lowered.

The high voltage used in the primary circuit is not suitable for operating the magnetic lock, and therefore I introduce the resistance coil in the secondary circuit to reduce the voltage and make the current suitable in the secondary circuit for the purpose intended. When starting a motor with which this apparatus may be connected, the baby knife-switch Q is left open and it is simply necessary to close the main switch, which then feeds the current through the fuses I, I¹, I² and coils L, L¹, L², to the motor. The coils are therefore energized by the flow of the current therethrough, which sets up a magnetic flux strong enough to draw up the armatures M, M¹, M² located beneath them. After these armatures are drawn up, the baby knife-switch should be closed. The secondary circuit is therefore closed except at the armatures. If the current should fail in any of the phases, the magnetic flux in the coöperating coil, is cut off, allowing the corresponding armature to drop. By the dropping of the armature, the secondary circuit is closed permitting the current to flow through the secondary circuit and release the magnetic lock. The lock-hook $f^1$ of the main switch is thereupon disengaged and the projector N causes the main switch to swing outward, thus breaking both the primary and secondary circuits. In this manner, the motor or other electrical apparatus is fully protected against all circuit troubles.

When the main switch is thrown out in the manner described by reason of the blowing of a fuse, all the armatures drop and in order to ascertain in which phase the current is interrupted, it is simply necessary to open the baby knife-switch Q and close the main switch F. This opens the secondary circuit and closes the circuits of all three phases at the main switch, thus drawing up the armatures and indicators in the uninterrupted phases while the armature and the indicator in the phase in trouble remains in lowered position. Examination of the indicating-fingers will therefore disclose which fuse has been blown out, making it unnecessary to remove more than one fuse from its retaining clip, since the indicating-finger on the armature found lowered will show that the corresponding fuse if any has been blown out. If, however, there is an interruption in any one of the phases from some other cause, the corresponding indicating finger will be lowered and upon the operator removing the fuse in that particular phase and replacing the same with a new one, he finds that the trouble has not been remedied, it will indicate that the removed fuse is serviceable and may be used without refilling and that the trouble in that particular phase lies elsewhere. It is apparent from the foregoing that interruption of the current in any of the phases or of the entire current will immediately cause the main switch to be thrown out, due to the lowering of one or more of the armatures, thus establishing a current through the secondary circuit; also that any trouble which would injure the motor or other electrical apparatus is guarded against by the use of my improved protector. When the entire current is cut out to stop the motor, the main switch is automatically thrown out by the current created by the motor itself, due to the rotation of the armature by momentum, thus showing at the time the motor is stopped that the protector is in perfect working order. Usually, starting-boxes are employed in connection with motors so that upon supplying the motor with current, the full voltage thereof cannot rush into the motor and injure the same. Therefore, when the current is shut off suddenly, the main switch is automatically thrown out as hereinbefore described, and the motor cannot be actuated on the return of the current until after said main switch is closed. The operator before closing the switch will manipulate the starting box, so that when the switch is closed, the current will be directed through the starting side of the starting-box instead of through the running side thereof, thus guarding against the full voltage of the current rushing into the motor.

My invention is susceptible to many changes and modifications and may also be applied to different phase electrical machinery without departing from the principle involved.

Having thus described my invention, what I claim is,—

1. A protector for polyphase electrical machinery, comprising a primary circuit including a switch, a secondary circuit including a magnetic-lock adapted to hold said switch in closed position, means for diverting current from the primary circuit to the secondary circuit upon failure of the current in any phase of the primary circuit so as to actuate the magnetic-lock and release the switch, means for indicating in which phase the current has failed, said means being operated to indicate, by actuation of said switch, and means for causing the switch to open when released from said magnetic-lock.

2. A protector for polyphase electrical machinery, comprising a support, a primary circuit including a switch mounted on said support and having a switch-blade in each phase, also including a fuse and a magnetic coil in each phase secured to said support, a secondary circuit including a magnetic-lock adapted to hold said switch in closed position, a resistance coil, and an armature for coöperation with each magnetic-coil of the primary circuit, said armatures being movable between contacts in the secondary circuit and the magnetic coils in the primary circuit and having means for indicating the position of the same, said indicating means being operated to indicate, by closing said switch after being automatically opened, each armature being attracted by its coöperating magnetic-coil and adapted to engage the coöperating contact in the secondary circuit upon failure of current in the corresponding phase of the primary circuit, and a spring-actuated device for forcing the switch into open position when released from the magnetic-block.

In testimony whereof, I have hereunto affixed my signature in the presence of two subscribing witnesses.

JOHN G. CLEMENS.

Witnesses:
EMIL NEUHART,
ELLA C. PLUECKHAHN.

---

Copies of this patent may be obtained for five cents each, by addressing the "Commissioner of Patents, Washington, D. C."

---

It is hereby certified that in Letters Patent No. 1,012,599, granted December 26, 1911, upon the application of John G. Clemens, of Buffalo, New York, for an improvement in "Protectors for Polyphase Electrical Machinery," an error appears in the printed specification requiring correction as follows: Page 2, lines 1 and 70, for the word "sprockets" read *sprickets;* and page 4, lines 22–23, for the compound word "magnetic-block" read *magnetic-lock;* and that the said Letters Patent should be read with these corrections therein that the same may conform to the record of the case in the Patent Office.

Signed and sealed this 23d day of January, A. D., 1912.

[SEAL.]

C. C. BILLINGS,
*Acting Commissioner of Patents.*